COLOR TELEVISION RECEIVING APPARATUS

Filed Aug. 26, 1944 4 Sheets-Sheet 1

Inventor:
Adolph H. Rosenthal,
By Cushman, Darby & Cushman
Attorneys.

COLOR TELEVISION RECEIVING APPARATUS

Filed Aug. 26, 1944 4 Sheets-Sheet 2

Inventor:

Adolph H. Rosenthal,

By Cushman, Darby & Cushman

Attorneys.

COLOR TELEVISION RECEIVING APPARATUS

Filed Aug. 26, 1944

Inventor:
Adolph H. Rosenthal,
By Cushman, Darby & Cushman
Attorneys.

COLOR TELEVISION RECEIVING APPARATUS

Filed Aug. 26, 1944

Inventor:
Adolph H. Rosenthal,
By Cushman, Darby & Cushman
Attorneys.

UNITED STATES PATENT OFFICE 2,513,520

COLOR TELEVISION RECEIVING APPARATUS

Adolph H. Rosenthal, New York, N. Y., assignor, by mesne assignments, to Skiatron Corporation, New York, N. Y., a corporation of New York Application August 26, 1944, Serial No. 551,274

25 Claims. (Cl. 178—5.4)

The present invention relates to color television receiving apparatus.

An important object of the invention is to provide a system whereby color can be controlled by means of a light modulating device of the supersonic cell type.

The use of light modulating devices of the supersonic cell type in television receivers adapted to produce images in black and white is recognized to be highly advantageous for producing large and bright pictures because of the light storage effect which is thereby obtained. By my invention such a cell may be used to produce an image in natural color upon the image presenting medium, i. e., screen or film. In addition, the present invention may be used to modify the color of the image.

The present invention also may be used to modify the color of the light used at the transmitter in certain systems which require quick color changes, as hereinafter described.

An important advantage of the invention resides in the fact that an image can be produced in natural color, by use of an apparatus which is of optimum simplicity. In fact, forms of the invention hereinafter disclosed for use in a receiver contain no more optical elements than the usual receiver producing television images in black and white by use of a supersonic cell.

It is known that a television receiving system for black and white can be developed to a color receiving system of the additive type by inserting suitable color filters, generally three for a 3-color system, at proper places of the optical path; that is, between the light source and the observer. Depending on the adopted standards, the partial color filters, and therewith the colored light beams transmitted therethrough, may be active either simultaneously or successively, the color mixture being obtained subjectively through the persistence of vision in the latter case. Known systems of this latter type often make use of a rotating disk into which the three types of color filters are inserted, and the disk by its rotation successively inserts the partial color filters in the light path. For instance, in certain cathode ray tube color systems, a color filter disc rotates in front of the cathode ray tube screen and therefore, the filter disk has to be of a large diameter, at least about three times the picture size on the cathode ray tube screen.

The same principle can be used with advantage in large screen television systems based on the supersonic light modulator in combination with mechanical scanners, such as described, for example, in Jeffree Patent No. 2,155,660, issued April 25, 1939, for Light Modulating Devices or on cathode-ray controlled light modulating tubes, such as described, for example, in Rosenthal Patent #2,330,171, issued September 21, 1943, for Television Receiving System. In this type of receiver the color filter disk can be relatively small, since it can be inserted at a place where the beam of light is constricted to a small cross section, for instance, near the light source, or near the high speed scanner. Therefore, the size of the filter disk has no relation to the size of the final projected picture. In the first-mentioned type of such a receiver the rotation of the disk, which has to be synchronized with the color field changes, can be directly coupled with the rotation of the low speed scanning member. In these types of receivers it is also possible to use three stationary filters at suitable places in the optical path, and to bring them successively into operation by a suitable moving shutter or shutters in front of them, and also by successively operating three separate light sources, one for each partial color.

An important object of the present invention is to provide an apparatus whereby the color of light traversing a supersonic light modulator can be modulated by varying electrical parameters impressed upon the modulator, thereby dispensing with filters.

A further object of this invention is to obtain color modulation by purely electronic means.

It is another object of certain embodiments of this invention to combine light and color modulation, and to effect both modulations purely electronically.

The supersonic light modulator such as described in the above-mentioned Jeffree patent is based on the discovery that supersonic waves excited in a liquid by a piezo-electric crystal act as an optical diffraction grating upon light traversing the liquid in a direction perpendicular to the direction of propagation of the supersonic waves. Thus, if an image of a light source is formed upon a screen, and if such a supersonic cell is inserted in the light path between the light source and the screen, the image of the light source will be drawn out into diffraction spectra if the supersonic light modulator is actuated. The intensities of the diffraction spectra compared to that of the original light are determined by the intensity of the supersonic vibrations, which is dependent upon the excitation of the crystal, and the dispersion of the spectra is dependent upon the frequency of the supersonic vibrations. In the common use of such a cell as a light modulator for black and white television, the integrated light of one or more diffraction spectra is utilized for the picture, the dispersion being generally small compared to the size of the image, thus leading to only a rudimentary development of a colored spectrum. On the other hand, by the present invention the color dispersion effect is directly utilized to obtain the color modulation required for color television and by making use of selected portions of one or more of the spectra produced by the cell. This leads to a large-screen color receiver of optimum simplicity.

Other objects and advantages of the invention will be apparent from the following specification and accompanying drawings wherein.

Figure 1:
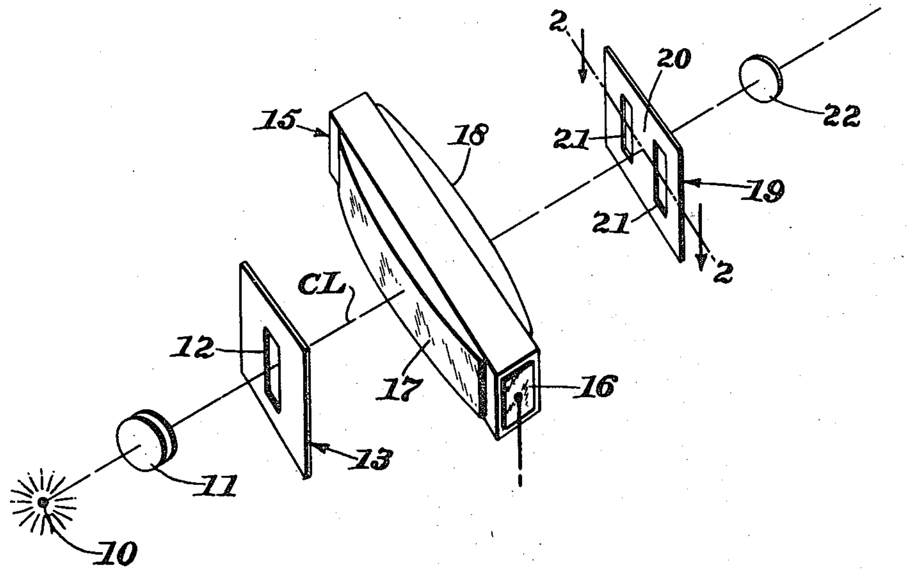
Figure 1 is a view diagrammatically showing a supersonic cell light modulating system.

Figure 1 diagrammatically illustrates a supersonic light modulator as used in a large-screen television receiver. A light source 10 illuminates through a condenser lens system 11 a slit-shaped opening 12 in a diaphragm 13. An image of this opening 12 is formed by the lenses 17 and 18 forming part of or being close to a light modulating device 15 of the supersonic cell type described in the above-mentioned Jeffree Patent No. 2,155,660, issued April 25, 1939, for Light Modulating Devices. This image is formed by lenses 17 and 18 upon a second diaphragm 19 which has slit-shaped openings 21 and an opaque portion 20 between openings 21 upon which the geometric-optical image of the opening 12 is formed. Thus no light will pass the diaphragm 19 when cell 15 is inactive. As is described in said Jeffree patent, supersonic waves can be created in the liquid of the cell 15 by causing a crystal 16 to oscillate by means of high frequency electric oscillations impressed thereon and which oscillations are modulated in their intensity according to the received television signals. When waves are thus created in the liquid, light issuing from opening 12, and which lens 17 causes to traverse the liquid column substantially parallel to the supersonic wave fronts, is diffracted from the central opaque portion 20 on diaphragm screen 19 towards the openings 21 by the supersonic waves. The light traversing these openings can be utilized by a lens system 22 for the formation of the picture. Actually, the diffraction grating formed by the periodic rarefactions and compressions of the liquid creates diffraction spectra to the right and left of the central image, and in the ordinary use of the modulator in a black and white television system the openings allow the passage of the integrated white light of one or more of these diffraction spectra.

Figure 2:
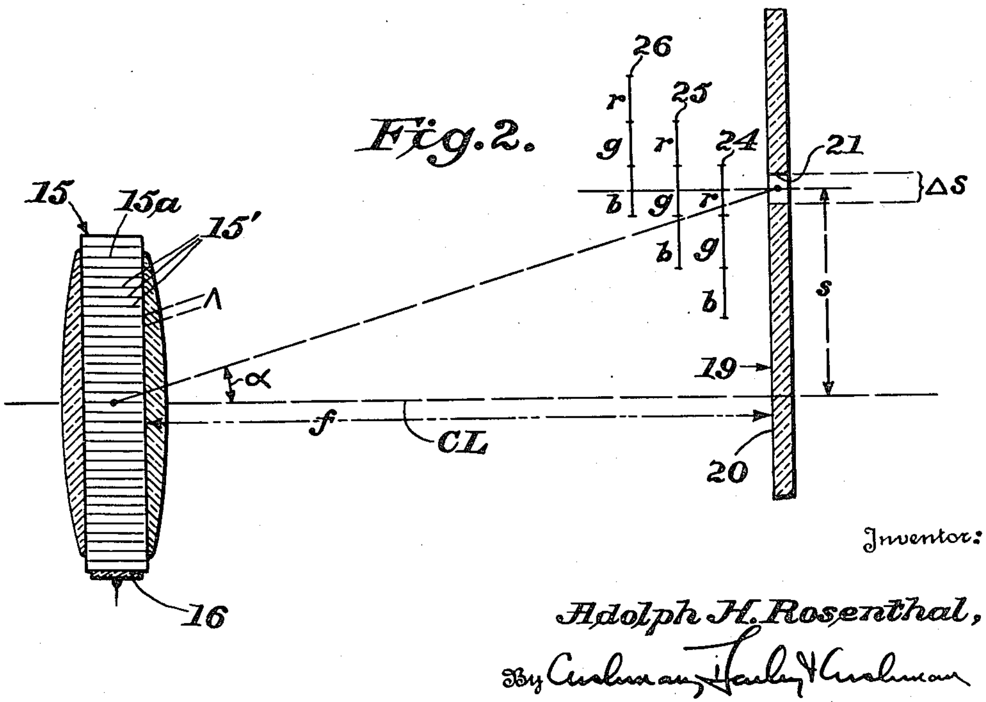
Figure 2 is an enlarged sectional view of the diaphragm illustrated in Figure 1, the view being taken on the line 2—2 of Figure 1.

Figure 2 diagrammatically shows a section along line 2—2 of Figure 1 through the spectrum diaphragm 19, and indicates the position of diffraction spectra created by the supersonic cell upon this diaphragm. It should be understood that the spectra 24, 25, and 26, which will be explained in detail in the following, are actually situated exactly on the plane of diaphragm 19 and are only displaced towards the left of this plane in Figure 2 for the purpose of clarity in description.

The line CL indicates the center line or optical axis of the system and only one-half of the diaphragm 19 and the spectra is shown in Figure 2. That is, in actual operation the same physical effects would occur symmetrically below the center line CL in Figure 2.

In order to clearly understand the principle of the present invention, it is necessary to discuss the quantitative relationships of the spectra formation with reference to Figure 2. It should be understood that the relative dimensions, angles, etc., indicated in Figure 2, are largely diagrammatic.

The numeral 15a indicates the liquid column of the supersonic cell 15, and the supersonic compressions are indicated by parallel lines 15'. The supersonic wave length is:

$$\Lambda=\frac{v}{N} \quad (1)$$

where $v$ denotes the velocity of the supersonic waves in the liquid, and N the frequency of the supersonic oscillations, i. e., the frequency of the electric oscillations impressed upon the crystal. If the wave length of the light passing through the supersonic cell is $\lambda$, then this light will be diffracted by the supersonic waves by an angle equal to $\lambda/\Lambda$. Thus, with a focal length $f$ of the spectra imaging lens 18 ($f$ being the distance between the diaphragm 19 and the supersonic cell) the distance $s$ on the diaphragm of the diffraction image of light of wave length $\lambda$ from the center of the diaphragm equals:

$$s=f\frac{\lambda}{\Lambda} \quad (2)$$

Introducing for $\Lambda$ the value shown in Formula 1, results in:

$$s=\frac{f}{v}\lambda N \quad (3)$$

This formula permits determination of the position of any diffracted color of wave length $\lambda$ in the spectrum on the diaphragm 19 for any frequency N of the exciting high frequency oscillations impressed upon the crystal. On the other hand, the formula also permits calculation for any given geometric arrangement of the modulator. That is, given $s$, $f$, and sound velocity $v$, one can calculate the necessary excitation high frequency N to be impressed upon the crystal in order to obtain a desired wave length, i. e., color, on a certain point of the diaphragm 19, in the following form:

$$N=\frac{s}{f}\frac{v}{\lambda} \quad (3')$$

The above calculations hold in all cases where the supersonic wave length $\Lambda$ is large compared to the optical wave length $\lambda$ in which case the diffraction angle can replace its sine, which always holds in all practical cases. Thus, for instance, with an average sound velocity $v$ of one thousand meters per second (1000 m./s.) and a supersonic frequency N of ten megacycles (10 mc.), according to Formula 1 the supersonic wave length $\Lambda$ is one tenth of a millimeter, whereas the wave length $\lambda$ of, for instance, average green light, amounts to 5400 Angstrom units (A.U.), approximately $^{5}/_{10000}$ millimeter, and thus is only about $^{1}/_{500}$ of the supersonic wave length.

The above discussions, and particularly Formula 3, show that, given any supersonic light modulator, by simply varying the exciting supersonic frequency N, that is, the electric frequency impressed upon the crystal, it is possible to vary within wide limits the position $s$ of any color band upon screen 19. Thus, by arranging an opening 21 at a given distance $s$ from the center CL, any desired color band can be caused to fall upon this opening by proper adjustment of the exciting frequency N. This fact shows that the supersonic light modulator is able to perform a purely electronic color modulation which can be utilized for various purposes, particularly for color television as hereinafter described.

The above formulas refer to so-called first-order diffraction spectra, in which the diffraction maxima are derived from interference of successive light beams which have a phase difference of one wave length only. For higher order spectra, in which the phase difference is a multiple of one wave length, the order number $n$ would have to be introduced in all the formula as a multiplying factor to $\lambda$, thus, for instance, Formula 2 would show that the distance $s$ of a particular color of a third-order spectrum would be just three times the one for the first-order spectrum and Formulas 3 and 3' show that if high order spectra are utilized, a correspondingly smaller exciting frequency N is required for the same position of any particular color. Though in the following discussions the numerical examples are given for the case of first-order spectra only, it should be clearly understood that in certain practical cases higher order spectra might be advantageous, and their use is clearly within the frame of this invention.

In the following, the case of a typical 3-color television system making use of the just discussed principles will be outlined by way of example.

The partial colors of such an additive 3-color system are comprised of color bands within which the intensity depends upon the wave length in a suitable manner so that the physiological 3-color stimuli curves of the human eye can be approached. The centers of the color bands may be at about 4500 A. U. for the blue, 5400 A. U. for the green, and 6200 A. U. for the red partial colors. Using, by way of example, a modulator system with a liquid of sound velocity $v$ equal to 1000 meters per second and with dimensions $f$ equal to 100 centimeters and $s$ equal to one centimeter, Formula 3' gives the following values of N in megacycles for the 3 optimal wave lengths $\lambda$:

*Table 1*

| Color | $\lambda$ (A. U.) | N (mc.) | $\Delta\lambda$(A. U.) $\Delta s$=0.3 mm. |
|---|---|---|---|
| blue | 4500 | 22.2 | 135 |
| green | 5400 | 18.5 | 172 |
| red | 6200 | 16.1 | 182 |

The first column of the above table gives the partial color. The second column gives the main wave lengths in Angstrom units, which in the first-order spectra fall at a distance of one centimeter from the center line CL upon the diaphragm 19. The third column gives the required crystal frequencies N in megacycles necessary in order to produce 3 spectra of the required positions and dispersions, and to place the wave lengths of the second column at the desired place on the diaphragm 19. If at this position of one centimeter from CL a slit opening 21 of a width of $\Delta s$ equal to 0.3 millimeter is arranged in the diaphragm 19 so that the distance of the center of this slit from the center line CL on the diaphragm equals one centimeter, this slit will for the three crystal frequencies N transmit light of spectral bands with centers at the wave lengths shown in the second column of Table 1 and with spectral extensions $\Delta\lambda$ as shown in the fourth column of Table 1 in Angstrom units (A. U.). The spectral band widths $\Delta\lambda$ of the fourth column can be easily obtained by differentiating Formula 3, above. Naturally, the spectral band widths for each column are proportional to the width of slit 21. By suitably profiling this slit opening 21 it can be arranged that the center of the slit corresponding to the wave lengths in the second column of Table 1 allows these optimum wave lengths to pass with maximum intensity, and to allow the neighboring wave lengths to pass with intensities steadily diminishing toward the limits of the partial color wave bands, i. e. toward the borders of opening 21.

Instead of profiling the opening 21, the same effect can be obtained by covering this opening with a transparent sheet, the transparency of which has its maximum in the center, and decreases towards the borders of opening 21.

If desired, the slight difference in the band widths, and thus the total intensities of partial colors passed by opening 21 for the three partial colors, can be compensated by arranging a suitable color filter or filters in the light path, for example, adjacent opening 21, or adjacent the light source, the filters being of such character that their absorption slightly increases towards longer wave lengths, thus compensating for the slight increase in spectral band widths towards such longer wave lengths.

It will be seen from Formula 3', above, that by varying $s$ and $f$, the required supersonic crystal frequencies N can be varied within wide limits. Furthermore, as has been explained above, use of higher order spectra will result in a great reduction of the required supersonic frequencies N, or, retaining substantially the same frequencies N, higher order spectra will permit larger distances $s$, and larger width of the opening 21, which in certain cases will have a favorable influence on the total amount of light passed by the system, depending upon the characteristics of the light source 10 used.

The above values for the spectral band widths $\Delta\lambda$ are strictly correct only if the width of the entrance slit 12 in diaphragm 13 would be infinitely small, and thereby the light passing the supersonic cell strictly parallel to the supersonic wave fronts. Since in practical cases the width of slit 12 has a certain extension, and is preferably in the order of the widths of slits 21 in diaphragm 19, a certain dilution of the purity of each spectrum created by a certain given supersonic frequency N results. In other words, regarding the color modulation system as a spectroscope, conditions obtain similar to those in any spectroscope with a finite opening of the entrance slit, resulting in a reduction of the theoretical resolving power. The final result is a slight increase of the theoretical band widths as given in Table 1 and the subsequently discussed Table 2.

Figure 3:
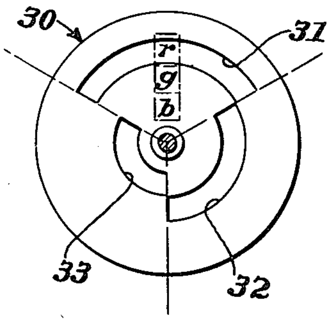
Figure 3 is an elevation showing a rotatable diaphragm used in a modification of the invention.

Figure 3 shows a method alternative to that illustrated in Figure 2, in that the fixed diaphragm 19 is replaced by a rotating diaphragm disk 30. This disk may be divided in three sections of 120° each, and each of these sections contains a one-third annular opening of such radius and width that it permits the passage of light of one of the desired partial color bands. Thus, opening 31 at the greatest distance from the axis of the disc is arranged to allow passage of the red color band, opening 32 at an intermediate position allows passage of the green color band, while opening 33 of the smallest radius will allow passage of the blue color band if the crystal is excited by a given supersonic frequency N. Rotation of this disk upon the axis CL coinciding with the center line CL in Figure 2 will cause the three color bands to be passed in succession. By this arrangement, it is possible to compensate for any difference in the intensities of the three spectra bands by giving each of the openings 31, 32 and 33 a suitable radial width. The rotation of diaphragm disk 30 is controlled by the frame synchronizing signals and the disk 30 can be mechanically connected to the low speed scanning members.

In a light modulator using a fixed opening 21 for the various spectral bands, as illustrated in Figures 1 and 2, and adapted to a color television system with successively changing partial colors, this successive change, as explained above, can be brought about by successively varying the supersonic wave lengths Λ in the liquid of the cell. This change will be brought about by varying the supersonic frequencies N of the exciting piezo-electric oscillator crystal. Two systems for doing this are discussed below.

Figure 4:
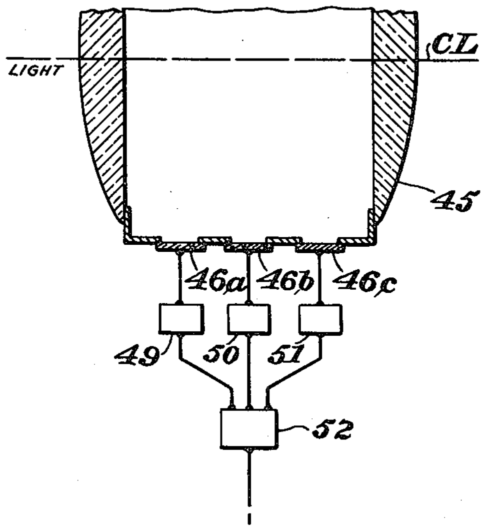
Figures 4 to 9 show modified forms of the invention.

By one system, three separate crystals can be used which are placed adjacent to each other in the direction of the light beams passing through the cell as indicated in Figure 4, where three crystals 46a, 46b and 46c are attached to the bottom of the supersonic cell 45 and are spaced in a direction parallel to the direction of the light passing through that cell. These three crystals have different resonance frequencies equal to the frequencies N and each crystal may be excited by separate oscillators 49, 50 and 51 acting upon crystals 46a, 46b and 46c, respectively. Each oscillator is tuned to one of the frequencies N as shown in Table 1 and the oscillators are active in succession, being controlled by an electronic switching arrangement 52, the switching actions of which are controlled in turn by the frame synchronizing signals. This electric switching action may be effected in various known ways; for example, by successively changing the grid biases of the oscillator tubes.

Alternatively, instead of using three separate crystals tuned to different frequencies, one crystal with a wide frequency response may be used, and the frequencies N exciting this crystal may again be switched on and off in succession in a way similar to that indicated with respect to the use of three crystals.

In both cases discussed immediately above, instead of using three tuned oscillators which are switched on and off electronically, one oscillator of changing oscillating frequency may be employed. The change of frequency can be brought about in a well known manner, for example, by inserting a variable impedance tube in the frequency determining oscillator circuit, and varying successively the impedance of this tube by changing its grid bias between three definite values, and causing this change by the frame synchronizing signals.

In the form stated above where one crystal is used, and that crystal is excited to oscillations of the three different frequencies N, it has been stated above that a wide band crystal can be used with a frequency response broad enough to permit oscillation of substantial amplitudes for the three different exciting frequencies. Though a quartz crystal has generally a very sharp frequency response, there are known means for considerably widening such response. For example, the oscillations can be suitably damped either by the liquid alone, or by additional damping layers attached to the crystal surface, or by combined crystals, e. g., crystals formed by cementing together two or more crystals of slightly different resonance frequencies which will result in coupled oscillations equivalent to a wide band response.

Such combined crystals may also be replaced by a crystal of wedge shape, i. e., the thickness of which slightly varies either in the direction of the optical axis, or perpendicularly thereto.

A wedge-shaped crystal, the thickness of which varies from $d_1$ to $d_2$, can be excited to vibrations of any frequencies between the limiting frequencies corresponding to these limiting thicknesses. If the crystal, for instance, is excited to a frequency corresponding to a medium thickness $d$, such parts of the crystal will predominantly vibrate at which the crystal has this particular thickness $d$. Thus by varying the exciting frequency between the two extreme values, different surface parts of the crystal, at such places corresponding to the respective thicknesses related to the exciting frequency, will vibrate.

Instead of varying the thickness of such a crystal, the surface of a crystal of equal thickness may be loaded with varying masses; for instance, by covering this surface with a thin metal layer, varying slightly in thickness along the crystal's surface and, for example, being sputtered on the crystal. Since the vibration frequency of a crystal is varied by a metal coating in accordance with the thickness of such coating, a coating of varying thickness will effect a variation of the resonance frequency of the crystal across its surface extension, in a similar way as has been just described in connection with a wedge-shaped crystal.

Instead of using a wedge-shaped crystal or wedge-shaped coating, which would enable the crystal to oscillate within a whole band of frequencies between the extreme frequencies, three different parts of the crystal may be ground to slightly different thicknesses, or a sputtered metal layer may be divided into three parts of different thickness. Such a crystal will only oscillate in three distinct frequencies across its thus constituted surface parts, and these distinct frequencies can be chosen to correspond to those required for the three color bands.

Obtaining a wide band response by damping would considerably increase the power necessary to excite the crystal in all three required frequencies, and instead of having such a wide band response extending with equal amplitude over all three frequencies, it would be preferable to have a response which is characterized by three peak resonances substantially situated at the three required frequency values N and of certain reduced band widths. Such a response of one crystal can be obtained by making use of its higher harmonic oscillations.

Thus, if making use, for example, of three partial color bands comprising the wave lengths 4550 A. U. for the blue, 5250 A. U. for the green, and 6200 A. U. for the red, the reciprocal values of these wave lengths λ, which according to Formula 3′ are proportional to the required N values, are in the ratio of 15:13:11 for any given values of s, f, v. Thus, the frequency values N required in order to place the diffraction spectra in such positions that the above partial color wave lengths are passed by the slit opening 21, are in the ratio 11:13:15, and can thus be excited as the 11th, 13th, and 15th harmonics of a crystal with a given fundamental frequency. It is known that thickness vibrations of piezo-electric crystals can be obtained with satisfactory amplitudes in any higher odd harmonics.

With the above chosen values s, f, v, and the above selected partial color bands, the following table is obtained:

*Table 2*

| Color | λ (A. U.) | N (mc.) | Harmonic of Fundamental 1466 kc. | Δλ (A. U.) Δs=0.3 mm. |
|---|---|---|---|---|
| red | 6200 | 16.1 | 11 | 186 |
| green | 5250 | 19.1 | 13 | 157 |
| blue | 4550 | 22.0 | 15 | 136 |

The values, which are approximate, show that the required three frequencies N can be obtained as the 11th, 13th, and 15th harmonics of a fundamental frequency of 1466 kilocycles. If it is desired to use a crystal of a fundamental frequency of, for instance, 1500 kilocycles, or 1.5 megacycles, it is only necessary, with the above values for f, v, to arrange the slit 21 at a slightly increased value s of approximately 1.04 centimeter. It should not be forgotten that the values in all tables will depend upon the v of the liquid used in the cell, and that the assumed value for v of 1000 meters per second, on which the tables are based, it is only an approximation. However, by choosing proper values for the geometric variables f and s, suitable frequency values N can be found for any given liquid and any desired partial wave bands. In the particular case described immediately above of making use of the higher odd harmonics of one crystal, a certain limitation is put on the relative values of the wave lengths of the three color bands, since their reciprocal values must be in a ratio of the order numbers of the harmonics, e. g., 11, 13, 15. However, the above Table 2 shows that fairly satisfactory values for the partial colors can be obtained which will satisfy this condition, and if using a slight color correction by a suitable fixed color filter or filters even more satisfactory values can be selected. In the fifth column of Table 2, the widths of the wave bands for a slit 0.3 millimeter are shown.

Another advantage of making use of the higher harmonics is that a crystal can be chosen of a rather low fundamental frequency, e. g., about 1.5 megacycles, and such low frequency crystals can be produced easier and cheaper, and constitute a more stable element in the supersonic light modulator, compared to the very thin crystals of high fundamental frequencies, the thickness of which amounts to small fractions of a millimeter only. Such a thicker crystal further is able to dissipate far larger amounts of energy and does not work so near its tolerance point. The excitation of this crystal in its higher harmonics is effected by applying to its electrodes the harmonic frequencies N successively, and the change-over from one frequency N to another one is effected in one of the ways described above.

Figure 5:
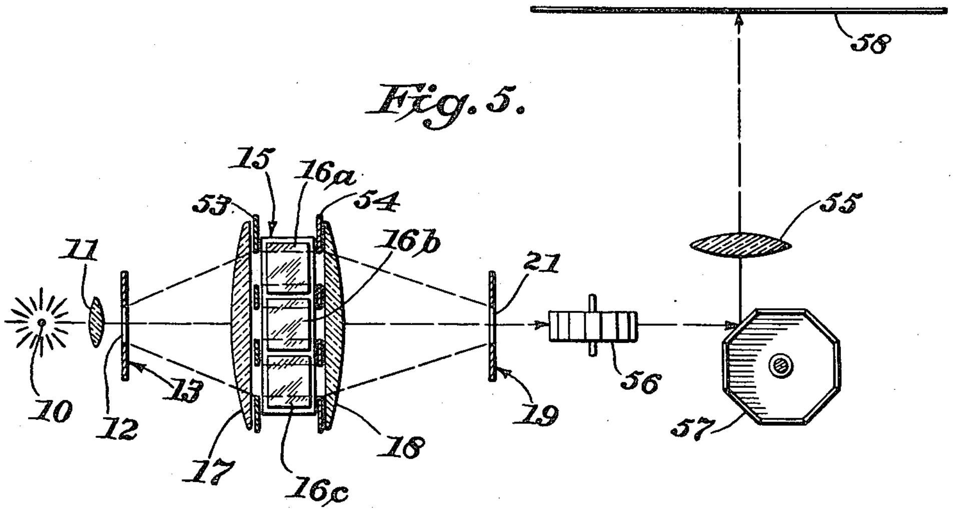

The above examples of color television systems refer to color television transmission standards in which the three partial colors are active successively, and their melting is effected through the persistence of vision of the human eye. The basic principles of this invention can also be applied to color television systems in which the three partial colors are simultaneously active. Figure 5 refers to such an application. This figure presents a view of the light modulator system along the direction in which the supersonic waves move and toward the crystal members. The supersonic cell 15 comprises three crystals 16a, 16b and 16c, which are arranged preferably in the same plane at one end of the cell, and in close proximity to each other. Light from the light source 10 is concentrated by a lens 11 upon the diaphragm 13, which is provided with a slit 12 extending in its longer direction parallel to the supersonic wave fronts, i. e., parallel to the plane of the drawing. This light is then directed toward lens 17 which makes the light traverse the supersonic waves parallel to their wave fronts. Thereafter the light is again focussed upon the diaphragm 19 with slits 21. Suitable diaphragm members, 53 and 54, may be inserted, for instance, between the lenses 17 and 18 and the cell 15, as shown in Figure 5, and serve the purpose of permitting the light to pass only through such parts of the cell as are traversed by supersonic waves, that is, not outside of the zones of excitation of the crystals 16a, 16b, and 16c. However, other means to serve the purpose of diaphragms 53 and 54 may be employed.

The diaphragm 19 contains two slit openings 21, parallel in their longer dimensions to the supersonic wave fronts, just as in Figures 1 and 2. The three crystals 16a, 16b and 16c are excited to the three frequencies N required in order to place the three partial color bands upon the openings 21. Again, as explained above, the three crystals may be of the proper thicknesses to oscillate in their fundamental oscillations with the required frequencies N.

Alternatively, three crystals of equal thickness and oscillating in a fundamental of approximately 1.5 megacycles may be used, each of which is excited in a different odd harmonic by the applied exciting oscillation of frequencies N.

In the case of a simultaneous color system, the electric oscillations of frequencies N are derived from three oscillators tuned to these frequencies, each of which is modulated by the received signals belonging to its particular partial color. These signals, which are simultaneously contained in the information received from the transmitter, are suitably separated and impressed by means of these oscillators upon the three crystals. It will thus be seen that each of the three crystals 16a, 16b and 16c acts as a light modulator for its particular partial color, and that the three partial color modulations are automatically superimposed at the diaphragm 19 by means of lens 18. The light passing openings 21 in diaphragm 19 can thus immediately be utilized for the formation of the picture. Suitable scanning members 56 and 57, for the line and frame scans, respectively, are arranged in the light path in a known manner. Exact register of the partial color pictures is inherently obtained upon picture screen 58 by the line width imaging lens 55, used in the manner known from the black-white system.

The just described embodiment of the present invention can also be employed advantageously for color systems in which the signals for the three partial colors arrive successively. In this case an electronic switch such as previously mentioned has to be employed and which switch connects the proper crystal into the circuit at the proper moment under control of the synchronizing signals. Thus, while in the simultaneous method all three crystals are simultaneously active, in a successive color system only one of the crystals 16a, 16b and 16c is active at a time. The two inactive crystals will not produce any supersonic waves during their inactivity so that no light will be diffracted through the openings 21 at the regions covered by the inactive crystals, and only the partial color correlated to the active crystal will be passed by the openings 21 and on to picture screen 58.

The arrangement shown in Figure 4 can equally be employed in such a way that the three oscillators 49, 50 and 51 are directly modulated in succession by the picture signals belonging to the proper partial colors, being connected in the circuit by the switch device 52, which in turn is controlled by synchronizing signals. This modulator arrangement would be inserted in the television receiver similarly to the modulator in Figure 5. A modulator arrangement as shown in Figure 5, compared to the one shown in Figure 4 has the advantage that it is applicable both to successive and simultaneous color standards, whereas Figure 4 is only applicable to a successive method.

In a simplified device, which also would be only adapted to a successive system, the three crystals of Figure 4 would be replaced by one crystal of the type which can be excited in the three frequencies N for the three partial colors, either by having a wide band characteristic or by making use of its higher odd harmonics. An electronic switch which connects this crystal successively with three oscillators of the proper frequencies N, or a variation of the frequency of one oscillator by a variable impedance tube is made use of as mentioned above. In both cases the changes are brought about by the synchronizing signals. Also, in this case the oscillator or oscillators are modulated by the partial color television signals.

Thus, in all color television systems just described, the supersonic cell acts as light modulator and as color modulator at the same time. It acts as a light modulator, as in the black-white systems in which it has been employed previously, with the difference that only a desired part of the total spectrum is passed by the diphragm 19, and in addition a color modulation is periodically effected in the successive systems through the change of the crystal frequencies, which effects a successive shift of the spectrum across the openings 21 of diaphragm 19, and therewith a successive change of the spectrum parts, or partial colors which can pass through the openings 21.

In the above examples described with reference to Figures 1, 2, and 5 the diaphragm 13 which is situated at that side of the supersonic cell facing the light source has been provided with one slit opening 12, and the diaphragm 19 on the other side of the supersonic cell has been provided with two slit openings 21. Instead of this arrangement, the diaphragm 13 can have two openings, and the diaphragm 19 one opening, and the effect upon the partial color diffraction will be the same. The arrangement where the exit diaphragm 19 has one central slit may have advantages in certain embodiments of the invention, where it might be easier to fully utilize the light by a small high-speed scanner 56 in this latter arrangement.

Figure 6:
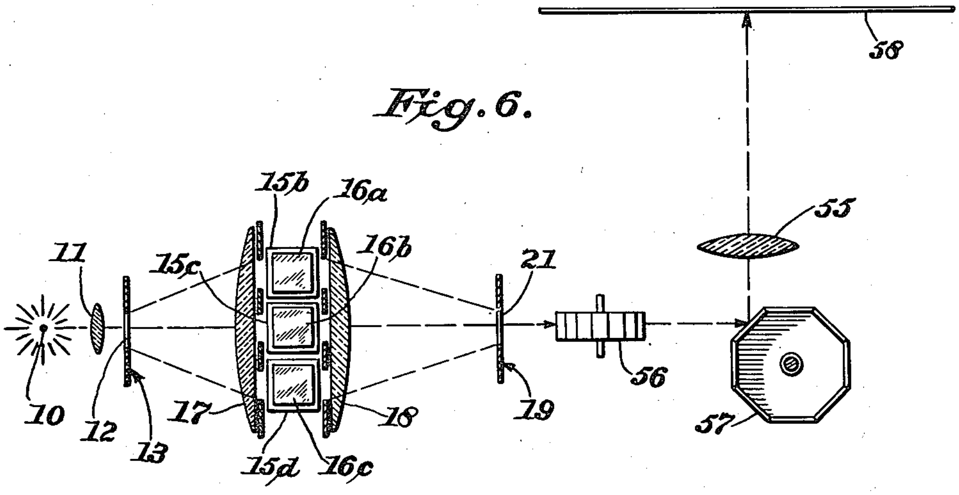

Various further modifications and embodiments are possible in addition to those described above. Thus, for example, in the case of a simultaneous color system, instead of the one cell containing three crystals, as shown in Figure 5, three cells could be employed each of which contains one crystal only. Such an arrangement is illustrated in Figure 6 which shows three cells 15b, 15c and 15d, each with its individual crystal 16a, 16b and 16c, respectively. In this case each lens 17 and 18 would serve the three cells together.

Figure 7:
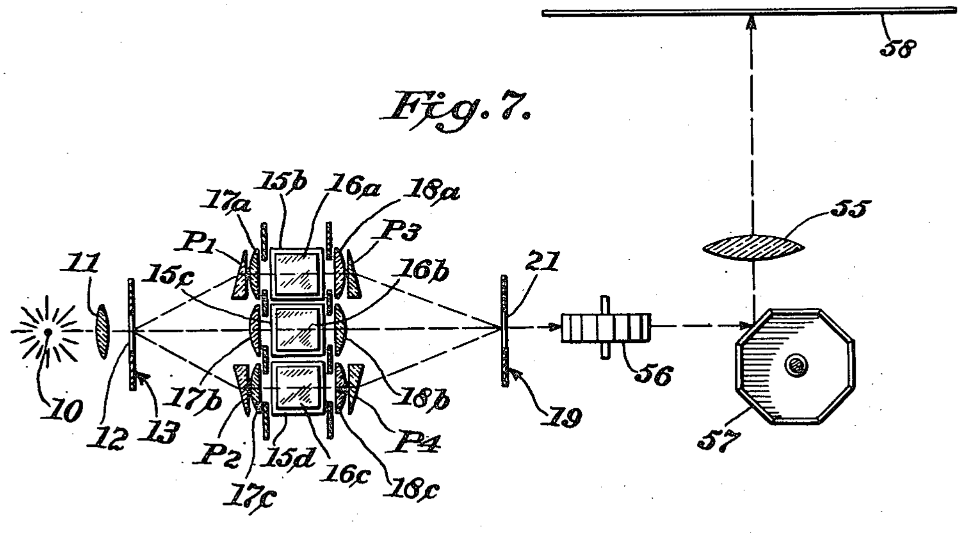

If, for geometrical reasons, a wider separation of the three cells is desired, the arrangement shown in Figure 7 may be used. In this form, the three cells 15b, 15c and 15d each has individual lenses as indicated at 17a, 17b and 17c and 18a, 18b and 18c. In addition, the two outermost cells 15b and 15d have deflecting prisms associated therewith as indicated at P1, P2, P3 and P4, which prisms deflect the light beams from diaphragm 13 so that they will be parallel to the wave fronts and will converge again on diaphragm 19.

The three crystals of Figures 6 and 7 can be tuned to the frequencies N, corresponding to the arrangement of Figure 5, and one diaphragm 19 used as illustrated in those figures. Alternatively, three identical diaphragms 19 can be used in the arrangements of Figures 6 and 7. In such case, separate lenses 18a, 18b and 18c can be provided in the arrangement of each figure and no prisms P3 and P4 need be provided in the arrangement of Figure 7. This latter arrangement can also be used where the three crystals of Figures 5, 6 and 7 are identical. In this case the slit opening in each will be at a proper distance from the center line or plane and suitable optical means would be provided to superimpose the partial colors on the drum 56.

Figures 8, 9:
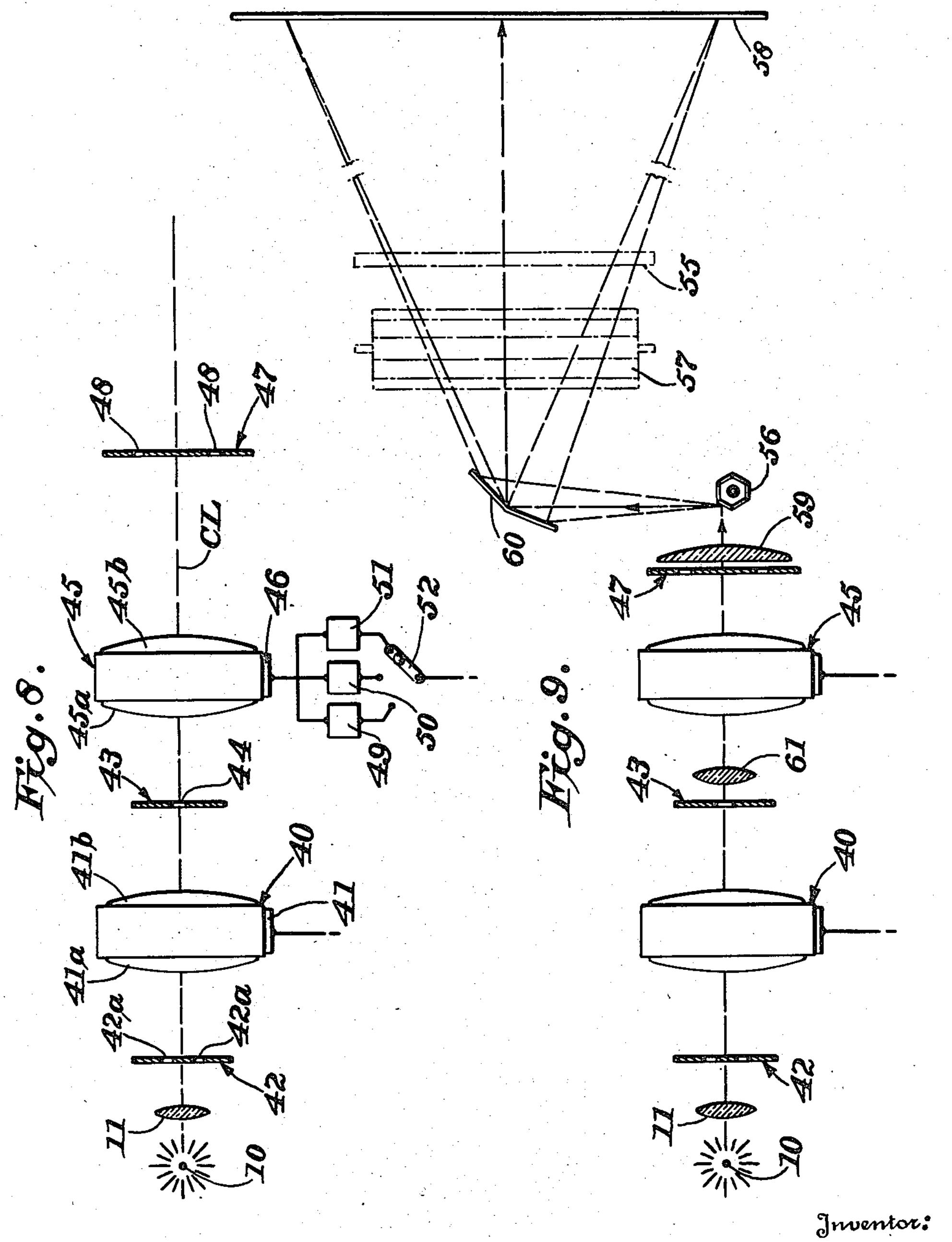

In certain cases it may be desirable to separate the functions of light intensity and color modulation. Referring to Figure 8, a light source 10 illuminates the diaphragm 42 by means of a condenser lens system 11. A light modulator cell 40 with crystal 41 and lenses 41a and 41b is inserted between the diaphragm 42 and another diaphragm 43. Diaphragm 42 contains two slit openings 42a and diaphragm 43 one slit opening 44. The arrangement described up to now constitutes a light modulator identical with the type employed in a black-white system, if crystal 41 is excited by electric oscillations modulated with the received television signals. The thus purely intensity-modulated white light issuing from slit 44 enters the separate color modulating system, of which slit 44 forms the entrance. A second supersonic modulator cell 45, with crystal 46 and lenses 45a and 45b, is inserted between diaphragm 43 and a third diaphragm 47, the latter containing two slits 48 corresponding to the slits 21 in the previously discussed figures. The plane of diaphragm 43 is imaged upon the diaphragm 47 by the lenses 45a and 45b. The position of the openings 48 is such that at three proper frequencies N in which crystal 46 is oscillating, the three proper partial colors are just passed by these openings 48. The crystal 46 is connected with three oscillators 49, 50, and 51 capable of oscillations in the three required frequencies N and which are successively brought into action by an electronic switch arrangement 52 which is controlled by the synchronizing signals. If desired, three crystals may be used instead of a single crystal 46.

The arrangement just described and shown in Figure 8, where the functions of intensity modulation and color modulation of the light are separated, permits an absolute independence between these two modulations. Since the intensity modulation in itself results in a certain band width of the supersonic frequencies, and thus variation of the spectral diffractions, in certain geometrical arrangements, and with certain television standards (i. e., intensity modulation frequencies), an undesirable interference between light intensity and color modulations might occur where those two modulations are performed by the same modulator. The arrangement above described with reference to Figure 8 avoids such possible interaction, since light intensity and color modulations are entirely separated.

It should be mentioned that the arrangement shown in Figure 8 can be modified in such a way that diaphragm 42 contains one opening, diaphragm 43 two openings, and diaphragm 47 one opening, all openings properly arranged as to width and position in order to provide the desired result in intensity and color modulation. Beyond diaphragm 47 in Figure 8 scanning members for line and frame scan would be arranged, as shown in Figure 5 and there designated by the numerals 56 and 57, respectively. Also a line width imaging lens and a picture screen such as designated in Figure 5 by numerals 55 and 58, respectively, would be used with the Figure 8 arrangement.

Alternatively to the just described embodiment, the light source may be followed first by the color modulator with its crystal or crystals and three oscillators, and then the intensity modulator may follow, thus effecting first the color modulation and then the intensity modulation of the light.

It should be pointed out that though in the above examples of successive color systems the change from one partial color to the next one has been generally effected by the frame or color field synchronizing signals, corresponding to known color television systems in which three complete pictures in the partial colors follow each other with the color field frequencies, the present invention with the exception of the embodiment as shown in Figure 3 can also be applied to such color television standards in which the color changes occur with line or even element frequency. In such systems the successive picture lines, or successive picture elements, will be represented successively by the three partial colors, i. e., the color modulator has to change its partial color characteristics either with line frequency, which may be in the order of 50,000 per second or more, or with element frequency, which may be in the order of 10 megacycles or more since the supersonic color modulator is able to follow even such quick changes, which would be impossible for a rotating filter disk arrangement.

Figure 9 shows schematically a receiver for color television making use of the principles of this invention, and particularly of employing a separate intensity and color modulating device. Details such as lenses, etc., not necessary for the explanation of the features of the present invention, are omitted. As in Figure 8 the light source 10 is followed by the light intensity modulator 40 and a color modulator 45 or vice versa, with suitable lenses and diaphragms 42, 43, and 47 as above explained in connection with Figure 8. A lens 59, preferably between the exit diaphragm 47 and the line-or high-speed scanner 56, forms an image of the supersonic wave trains in the light intensity modulator 45 upon the picture screen 58, this image representing a succession of picture elements, i. e., part of a picture line, as known from the black-white supersonic television system. In many cases, and particularly if the modulator 40 effects the intensity modulation, i. e., contains the supersonic wave trains representing the picture elements, it is preferable to employ another lens 61 adjacent to the intermediate diaphragm 43, which lens forms an image of the center plane of cell 40 upon the center plane of cell 45. A frame-or low-speed scanner 57 effects the scan perpendicular to the picture lines, and cylindrical lens 55 with imaging power in a plane perpendicular to the plane of Figure 9, forms an image of the width of line scanner 56 (perpendicular to the plane of Figure 9) on screen 58, thus defining the width of the picture lines. A device 60 is shown in Figure 9, consisting of two or more mirrors suitably inclined to each other. The purpose of this device, which is the subject matter of my co-pending application for Scanning Assemblies, Serial No. 523,716, filed February 24, 1944, is to effect for each revolution of the high-speed scanner 56 a number of line scans equal to the multiple of the number of polygon mirrors of scanner 56. Thus this device permits a considerable reduction of the speed of rotation of high-speed scanner 56 for a given number of lines per second, or with a given rotation speed of scanner 56, permits a greatly increased number of lines to be scanned per second. The use of such a multiple mirror device is of particular importance for color television, where generally a larger number of lines per second have to be scanned compared to black-white television, as has been explained in the above mentioned copending application.

The terminology used in the specification is for the purpose of description and not of limitation, the scope of the invention being indicated in the claims.

I claim:

1. In a television receiver, a source of light, means to modulate light from said source according to a received picture signal, means including said first mentioned means to produce a band of light wherein color components of the light are arranged in a spectrum, and means including movable shutter means to control the passage of predetermined color components of said spectrum from said modulating means to an image receiving surface.

2. In a television receiver, a source of light, means to modulate light from said source according to a received picture signal, means including said first mentioned means to produce a band of light wherein color components of the light are arranged in a spectrum, and means to selectively control the passage of a predetermined color component of said spectrum from said modulating means to an image receiving surface.

3. A television receiver of the character described in claim 2, wherein said means to produce a spectral band of light includes a plurality of means each producing a band of light wherein color components are arranged in overlapping spectra.

4. In a television receiver, a source of light, a supersonic cell light modulating device, means to operate said device in accordance with a received picture signal to modulate light from said source, means to produce and selectively shift a band of light wherein color components are arranged in a spectrum, and means including a diaphragm element to control the passage of a predetermined color component of the spectrum formed by said light modulating means to an image receiving surface.

5. In a television receiver, a source of light, a supersonic light modulating device, means to operate said device in accordance with a received picture signal to modulate light from said source, means to produce and selectively shift a band of light wherein color components are arranged in a spectrum, a stationary diaphragm element to control the passage of a predetermined color component of the spectrum formed by said light modulating means, and means including the diaphragm means for forming an image.

6. In a television receiver, a source of light, a supersonic cell light modulating device, means to operate said device in accordance with a received picture signal to modulate light from said source, means to produce a band of light wherein color components are arranged in a spectrum, and means including a rotary diaphragm element to control the passage of predetermined color components of the spectrum formed by said light modulating means to an image receiving surface.

7. In a television receiver, a source of light, a supersonic cell light modulating device, means to operate said device in accordance with a received picture signal to modulate light from said source, means to produce a band of light wherein color components are arranged in a spectrum, and means including a rotary diaphragm element to control the passage of predetermined color components of the spectrum formed by said light modulating device to an image receiving surface, said diaphragm including a plurality of circumferentially extending arcuate slots positioned at different distances from the axis thereof.

8. A television receiver of the character described in claim 7 wherein the arcuate slots in the rotary diaphragm have different radial widths.

9. In a television receiver, a source of light, a supersonic cell light modulating device, means to operate said device in accordance with a received picture signal to modulate light from said source, means including said first mentioned means to produce a band of light wherein color components are arranged in a spectrum, said spectrum means including a crystal to form waves in said device, diaphragm means to control the passage of predetermined color components of the spectrum produced by said device, means to impose different frequencies upon said crystal to shift the spectrum relative to the diaphragm, and means including the diaphragm means for forming an image.

10. In a television receiver, a source of light, a supersonic cell light modulating device including a plurality of crystals, means to modulate said light by operating said device in accordance with a picture signal, means to vibrate said crystals according to a received signal to produce bands of light wherein color components are arranged in spectra, and means including diaphragm means to control the passage of predetermined color components to an image receiving surface.

11. A television receiver of the character described in claim 10 wherein the crystals are spaced from each other in a direction perpendicular to the optical axis of said light modulating device.

12. A television receiver of the character described in claim 10 wherein the crystals are spaced from each other in a direction parallel to the optical axis of said light modulating device.

13. A television receiver of the character described in claim 10 wherein the crystals are spaced from each other in a direction perpendicular to the optical axis of said device and each crystal is mounted in a separate cell.

14. A television receiver of the character described in claim 10 wherein the crystals are spaced from each other in a direction perpendicular to the optical axis of said device and means is provided to direct light from said source to the portion of said device associated with each crystal.

15. A television receiver of the character described in claim 10 wherein the crystals are spaced perpendicular to the optical axis of said device and separate diaphragms are provided to receive the light from the portion of the device associated with each crystal.

16. In a television receiver, a source of light, a supersonic cell light modulating device, means to operate said device in accordance with a received picture signal to modulate light from said source, means to produce a band of light wherein color components are arranged in spectra, said spectral means including a plurality of crystals associated with said device, means to vibrate each of said crystals at selected and respectively different frequencies, and means to control the passage of predetermined color components of the spectra to an image receiving surface.

17. In a television receiver, a source of light, a supersonic cell light modulating device, means to operate said device in accordance with a received picture signal to modulate light from said source, means to produce a band of light wherein color components are arranged in a spectrum, said spectral means including a plurality of crystals associated with said device, means to vibrate each of said crystals at selected and respectively different frequencies in successive order, and means to control the passage of predetermined color components of the spectrum to an image receiving surface.

18. In a television receiver, a source of light, a supersonic cell light modulating device, means to operate said device in accordance with a received picture signal to modulate light from said source, means to produce a band of light wherein color components are arranged in spectra, a plurality of crystals associated with said spectra forming means, means to simultaneously vibrate each of said crystals at selected frequencies, means to control the passage of predetermined color components of the spectra to an image receiving surface.

19. In a television receiver, a source of light, a supersonic cell light modulating device, means to operate said device in accordance with a received signal to modulate light from said source, means to produce a band of light wherein color components are arranged in a spectrum, the last mentioned means including a crystal to form supersonic waves in said device, means to impose different frequencies upon said crystal by exciting higher harmonic frequencies of the fundamental mechanical resonance frequency of said crystal, and means to control the passage of predetermined color components of the spectrum to an image receiving surface.

20. In a television receiver, a source of light, a first supersonic cell light modulating device, means to modulate the intensity of the light passing therethrough according to a received picture signal, a diaphragm in the path of light issuing from the first device, a second supersonic cell light modulating device arranged in tandem with the first device, means to so control the frequency of oscillations in said second device according to a received color synchronizing signal to form the light passing therethrough into a spectral band, means to control the passage of predetermined components of said spectral band, and means to form the light issuing from the tandem arrangement into an image.

21. In a television receiver, a source of light, a supersonic cell light modulating device, means to modulate the intensity of the light from said source according to a received picture signal, means to produce a band of light wherein color components are arranged in a spectrum, a crystal associated with said band forming means, means to vibrate different portions of said crystal at different frequencies, and means to control the passage of predetermined color components of the spectrum to an image receiving surface.

22. In a television receiver, a source of light, a supersonic cell light modulating device, means to operate the cell device according to a received picture signal to modulate light passing through the cell device, means to form light issuing from said cell into a spectral band, means to receive light from said spectrum forming means, means to vary the operation of said spectral band forming means to vary the position of the formed spectrum with respect to said light receiving means, and means including the light receiving means for controlling the passage of predetermined color components of the spectrum to an image receiving surface.

23. In a television receiver, a light modulating supersonic cell containing a liquid, means to direct light upon the liquid of said cell, means to receive light from said cell, means to produce waves in the liquid of said cell to arrange the color components of the light into a spectrum, said wave producing means being variable by control of a received signal to vary the frequency of the waves in the liquid to thereby vary the position of the produced spectrum with respect to said light receiving means, means for modulating the intensity of the waves in the liquid in accordance with a received picture signal, and means including the light receiving means for forming an image.

24. In a television receiver, a source of light, a supersonic cell light modulating device, means to operate said device in accordance with a received picture signal to modulate light from said source, means to form in an adjacent plane a band of light wherein color components are arranged in a spectrum, diaphragm means in said plane to bar projection past said plane of all of said spectrum except a predetermined color band, and means including the diaphragm means for forming an image.

25. A television receiver of the character described in claim 24 wherein the band forming means includes means to simultaneously form a plurality of spectra upon said plane.

ADOLPH H. ROSENTHAL.

REFERENCES CITED

The following references are of record in the file of this patent:

UNITED STATES PATENTS

| Number | Name | Date |
|---|---|---|
| 1,746,083 | Kurtz | Feb. 4, 1930 |
| 2,099,889 | Ives | Nov. 23, 1937 |
| 2,109,540 | Leishman | Mar. 1, 1938 |
| 2,118,160 | Cawley | May 24, 1938 |
| 2,158,990 | Okolicsanyi | May 16, 1939 |
| 2,278,940 | Murphy | Apr. 7, 1942 |